S. McDONALD.
ANIMAL TRAP.
APPLICATION FILED JULY 22, 1910.
986,928.
Patented Mar. 14, 1911.
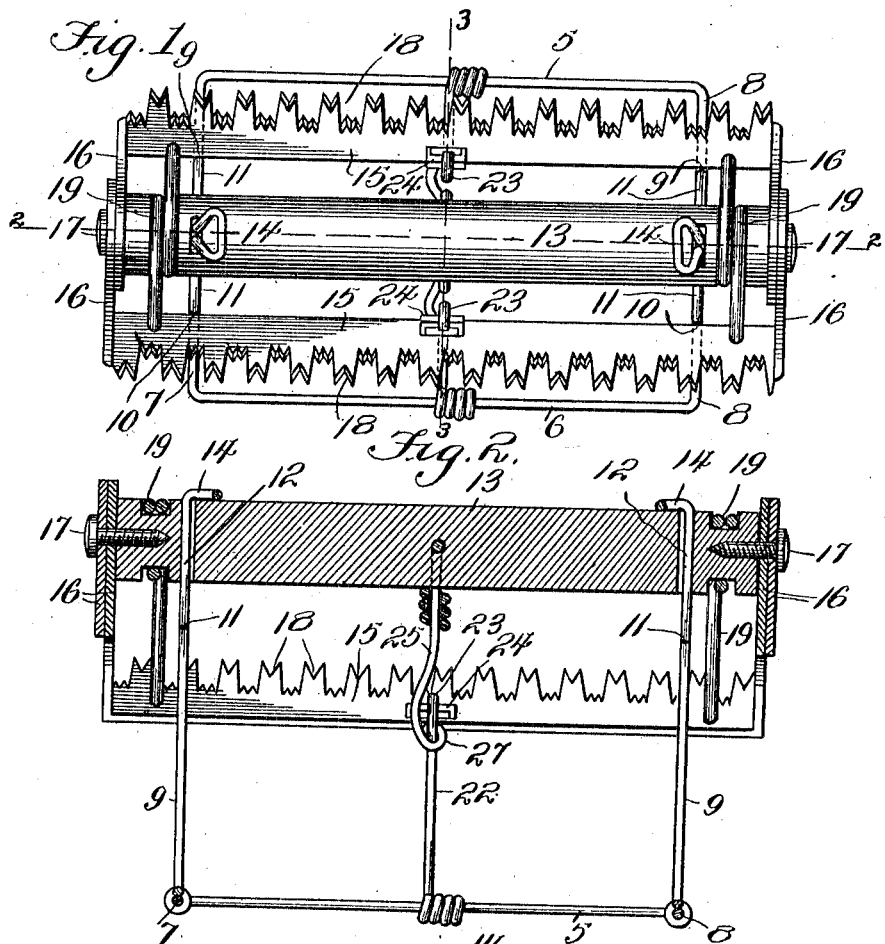

UNITED STATES PATENT OFFICE.

STEPHEN McDONALD, OF NOGO, ARKANSAS.

ANIMAL-TRAP.

986,928.

Specification of Letters Patent.

Patented Mar. 14, 1911.

Application filed July 22, 1910. Serial No. 573,272.

*To all whom it may concern:*

Be it known that I, STEPHEN McDONALD, a citizen of the United States, residing at Nogo, in the county of Pope and State of Arkansas, have invented new and useful Improvements in Animal-Traps, of which the following is a specification.

This invention relates to improvements in traps and more particularly to the type employed for catching chicken-hawks and other birds.

One object of the invention is the provision of a trap which may be readily secured to the railing of a fence or to the top of a chicken coop and when in set position will present a perch or treadle upon which the bird may readily alight to secure bait.

With the above and other objects in view which will more fully hereinafter appear the present invention consists in certain novel details of construction and arrangement of parts, hereinafter fully described, illustrated in the accompanying drawings, and more particularly pointed out in the appended claims; it being understood that various changes in the form, proportion, size, and minor details of the device, may be made, within the scope of the appended claims, without departing from the spirit or sacrificing any of the advantages of the invention.

In the accompanying drawings, forming part of the specification;—Figure 1 is a plan view of the device showing the jaws in set position. Fig. 2 is a longitudinal sectional view on the line 2—2 of Fig. 1. Fig. 3 is a transverse sectional view on the line 3—3 of Fig. 1.

Similar numerals of reference are employed to designate corresponding parts throughout.

The trap includes in its construction an oblong frame preferably formed of wire, the opposite longitudinal sides of which are designated by the numerals 5 and 6 and the opposite ends by the numerals 7 and 8. Rising from the opposite ends 7 and 8 are uprights, each of which includes parallel side portions 9 and 10, the upper end portions of which are bent inwardly and at right angles to provide shoulders 11, the said shoulders terminating in parallel portions 12 which bear one upon the other.

What will subsequently be termed a perch or treadle is designated by the numeral 13. This member is preferably formed of a round piece of wood, the length of which is somewhat greater than the length of the frame. Formed adjacent to the opposite ends of the perch or treadle are transverse openings which receive the parallel portions 12. The parallel portions 12, frictionally bind on the walls of the openings in the treadle so that when the latter is moved upwardly on the parallel portions 12, a considerable force will be necessary to move the said treadle downwardly and into engagement with the shoulders 11. The extremities of the parallel portions 12 are bent outwardly, as shown at 14, to provide stops to prevent disengagement of the treadle. It will of course be understood that the lengths of the parallel portions 12 will be considerably greater than the diameter of the perch or treadle 13.

Supported by the perch or treadle 13 are a pair of gripping jaws. These members include body portions 15 corresponding approximately in length to the length of the perch or treadle, the said body portions being oblong in contour and rectangular in cross section and terminating at their opposite ends in inwardly bent portions 16, the said bent portions 16 bearing one upon the other and having alining openings to aline with the openings formed in the central portions of the opposite ends of the perch or treadle, these openings receiving pivot pins 17, upon which the jaws turn. The opposed inner edges of the jaws are serrated, as shown at 18, the serrated portions interlocking when the jaws are in closed position.

Formed adjacent to the opposite ends of the perch or treadle are circular grooves in which are arranged helical springs 19. The opposite terminals of these springs are secured to the opposite end portions of the bodies 15 of the jaws, and normally the end portions of the springs extend vertically upward, thus holding the jaws in closed position. It will be manifest when the jaws are moved outwardly in opposite directions that the springs will be tensioned.

Rising from the intermediate portions of the opposite sides 5 and 6 of the frame are what will subsequently be termed a pair of triggers 20 and 21. The upper end portions of these triggers are offset inwardly and terminate in upwardly and outwardly curved bills or hooks 23. The extremities of these bills or hooks engage with projections 24 formed on the inner faces and at the medial portions of the bodies 15 of the jaws. The upper end portions of the triggers are in alinement with the sides 9 and 10 of the uprights, and since the triggers are formed of wire, it will be manifest when the jaws are moved downwardly to the position shown in Fig. 1 the hooks or bills, when engaging with the projections 24, will, owing to the resiliency of the triggers hold the jaws in open position.

A pair of dogs 25 and 26 are shown to be formed of a single piece of wire, this wire being passed through an opening in the middle of the perch or treadle 13, and thence trained over the lower side of the perch and twisted upon itself for a portion of its length and terminating in diverging portions the outer ends of which are provided with offsets 27 to bear on the offsets at the upper end portions of the triggers. Thus it will be seen when the parts are in position as shown in Fig. 1 that a bird alighting on the perch or treadle 13 will move the latter downwardly, whereupon the offset portions of the dogs will move the hooked end portions of the triggers inwardly and out of engagement with the projections of the jaws, whereupon the latter will move to closed position and into engagement with the legs of the bird.

From the foregoing, it is evident that I have provided a device which is comparatively simple in structure and inexpensive in manufacture, embodying few parts and these so arranged that the danger of derangement will be reduced to a minimum.

I claim:—

1. A trap comprising a frame, uprights at the opposite ends thereof, a treadle slidingly fitted on the uprights, spring-actuated jaws carried by the treadle, triggers carried by the frame to engage the jaws and dogs carried by the treadle to engage the triggers.

2. A trap comprising a frame, uprights at the opposite ends thereof, a treadle slidingly fitted on the uprights, spring-actuated jaws carried by the treadle, triggers carried by the frame to engage the jaws, dogs depending from the treadle to engage the trigger.

3. A trap comprising a frame, uprights at the opposite ends thereof, a treadle slidingly fitted on the uprights, spring-actuated jaws carried by the treadle, resilient triggers rising from the frame to engage the jaws, and dogs depending from the treadle to engage the triggers.

4. A trap comprising a frame, uprights at the opposite ends of the frame, the said uprights having adjacent to their upper ends shoulders, a treadle slidingly fitted on the uprights above the shoulders and movable into engagement with the latter, spring-actuated jaws carried by the treadle, resilient triggers rising from the frame to engage the jaws, and dogs depending from the treadle to engage the triggers.

In testimony whereof I affix my signature in presence of two witnesses.

STEPHEN McDONALD.

Witnesses:
JOSIE BELL,
C. C. BELL.

---

Copies of this patent may be obtained for five cents each, by addressing the "Commissioner of Patents, Washington, D. C."